(12) United States Patent
Kitazawa (10) Patent No.: US 11,742,887 B2
(45) Date of Patent: Aug. 29, 2023

(54) RADIO CONTROL TRANSMITTER FOR PERFORMING REMOTE CONTROL OF A CONTROL TARGET

(71) Applicant: FUTABA CORPORATION, Chiba-ken (JP)

(72) Inventor: Hideo Kitazawa, Mobara (JP)

(73) Assignee: FUTABA CORPORATION, Mobara (JP)

( * ) Notice: Subject to any disclaimer, the term of this patent is extended or adjusted under 35 U.S.C. 154(b) by 0 days.

(21) Appl. No.: 17/726,726

(22) Filed: Apr. 22, 2022

(65) Prior Publication Data

US 2022/0352917 A1 Nov. 3, 2022

(30) Foreign Application Priority Data

Apr. 28, 2021 (JP) ................. 2021-075973

(51) Int. Cl.
*H04B 1/3888* (2015.01)
*H04B 1/59* (2006.01)
*H04B 1/44* (2006.01)

(52) U.S. Cl.
CPC ............. *H04B 1/3888* (2013.01); *H04B 1/44* (2013.01); *H04B 1/59* (2013.01)

(58) Field of Classification Search
CPC ........ B62K 23/06; B62K 23/02; B62K 11/14; B62K 23/04; B62K 2202/00; B62K 21/12; B62K 21/125; B62K 11/04; B62K 2204/00; B62K 5/027; G05G 1/04; G05G 1/02; G05G 1/01; G05G 1/06; G05G 5/03; G05G 1/10; G05G 2009/04766; G05G 13/00; G05G 2009/04774; G05G 2700/30; G05G 5/05; G05G 9/047; G05G 9/04788; G05G 9/04792; H04B 1/0346; H04B 1/02; H04B 1/04; H04B 1/3888
See application file for complete search history.

(56) References Cited

FOREIGN PATENT DOCUMENTS

JP 2015213660 A * 12/2015

* cited by examiner

*Primary Examiner* — Golam Sorowar
(74) *Attorney, Agent, or Firm* — Bacon & Thomas, PLLC (57) ABSTRACT

A radio control transmitter, comprising a grip portion gripped by an operator when performing remote control of a control target, a base portion disposed at one end of the grip portion, and a head portion disposed at the other end of the grip portion and having an operating member for controlling the control target, transmits a control signal to the control target in response to an operation of the operating member including a wheel that controls a traveling direction of the control target. The radio control transmitter further comprises a switch mechanism including an operating lever, to which the wheel is detachably attached, disposed at an outer peripheral portion of the switch operating member attached to a main body fitting portion of the head portion, and a switch disposed in the switch operating member to activate a pre-assigned function when the operating lever is pulled toward an axially outer side of a rotation shaft of the wheel.

4 Claims, 10 Drawing Sheets

RADIO CONTROL TRANSMITTER FOR PERFORMING REMOTE CONTROL OF A CONTROL TARGET

TECHNICAL FIELD

The present disclosure relates to a radio control transmitter for performing remote control of a control target, e.g., various models (automobiles, motorcycles, aircraft, ships, and the like), a drone, an industrial machine such as a crane or the like, via wireless communication.

BACKGROUND

Conventionally, a radio control transmitter including a trigger for operating a throttle of an engine or a motor and a wheel for controlling steering of a control target, which is disclosed in, e.g., Japanese Patent Application Publication No. 2003-325994, is known as a radio control transmitter used mainly for operating a model car.

Further, in the radio control transmitter disclosed in Japanese Patent Application Publication No. 2003-325994, a switch is disposed at an operation unit that supports a wheel to be rotatable with respect to a main body fitting portion disposed at a front center of a main body. In general, a trim switch in which a lever is tilted along a rotation direction of the wheel, or a function switch in which an operation piece is inserted into an axially inner side of the rotation shaft of the wheel toward the main body fitting portion is used as the switch disposed at the operation unit.

SUMMARY

In such a radio control transmitter, it is expected to control a control target in response to a recent increase in the number of channels by diversifying a switch mechanism in addition to the trim switch and the function switch that are described above.

In view of the above, the present disclosure provides a radio control transmitter capable of increasing variation of a switch mechanism.

To this end, a radio control transmitter is provided, which comprises a grip portion gripped by an operator at the time of performing remote control of a control target, a base portion disposed at one end of the grip portion, and a head portion disposed at the other end of the grip portion and having an operating member configured to control the control target, and is configured to transmit a control signal to the control target in response to an operation of the operating member including a wheel that controls a traveling direction of the control target. The radio control transmitter further comprises a switch mechanism including: an operating lever, to which the wheel is detachably attached, disposed at an outer peripheral portion of the switch operating member attached to a main body fitting portion of the head portion; and a switch disposed in the switch operating member and configured to activate a pre-assigned function when the operating lever is pulled toward an axially outer side of a rotation shaft of the wheel.

According to the radio control discloser of the present disclosure, a lever head of the operating lever may protrude from an outer peripheral surface of the switch operating member near the wheel.

According to the radio control transmitter of the present disclosure, the lever head of the operating lever may be attachable to and detachable from a lever body.

The radio control transmitter according to the subject disclosure may comprise a cover member that is attachable to and detachable from the lever body to cover a space portion formed on the outer peripheral surface of the switch operating member when the lever head is removed from the lever body.

BRIEF DESCRIPTION OF THE DRAWINGS

The objects and features of the present disclosure will become apparent from the following description of embodiments, given in conjunction with the accompanying drawings, in which.

DETAILED DESCRIPTION

Hereinafter, embodiments of the present disclosure will be described in detail with reference to the accompanying drawings.

A radio control transmitter (hereinafter, simply referred to as "transmitter") according to the present disclosure performs remote control of a control target, e.g., various models (automobiles, motorcycles, aircraft, ships, and the like), a drone, an industrial machine such as a crane or the like, by using a predetermined frequency band (e.g., 2.4 GHz band), determining a transmission frequency using a frequency hopping method that automatically selects an empty band of the frequency band, and transmitting to the control target a control signal (radio wave) corresponding to an operation of operating members (wheel and trigger) disposed at a housing.

In this example, a case where a transmitter performs remote control of a model car as a control target will be described as an example. Although it is assumed that an engine is used as a power source of the control target, a motor may be used as the power source.

<1. Configuration of Transmitter>

Figure 1:
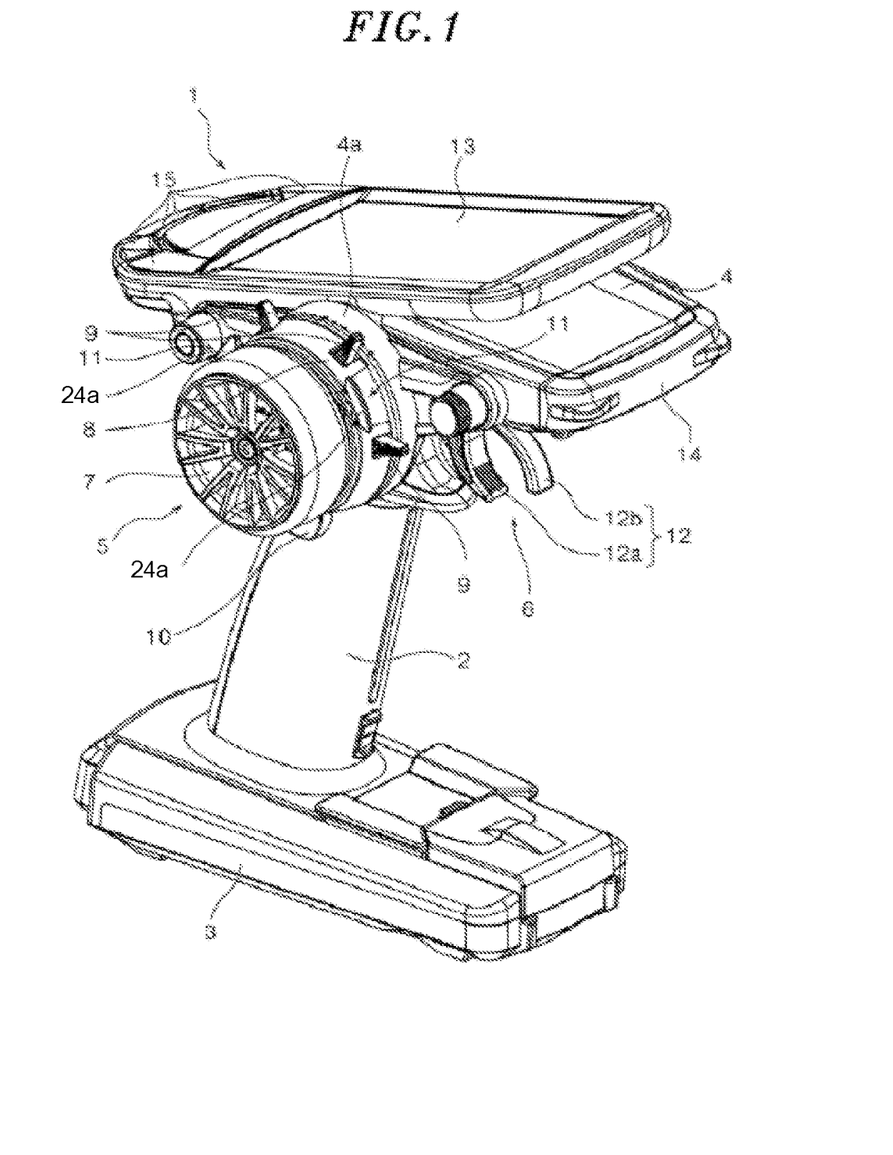
FIG. 1 is a perspective view showing an overall configuration of a radio control transmitter according to the present disclosure.
Figure 2:
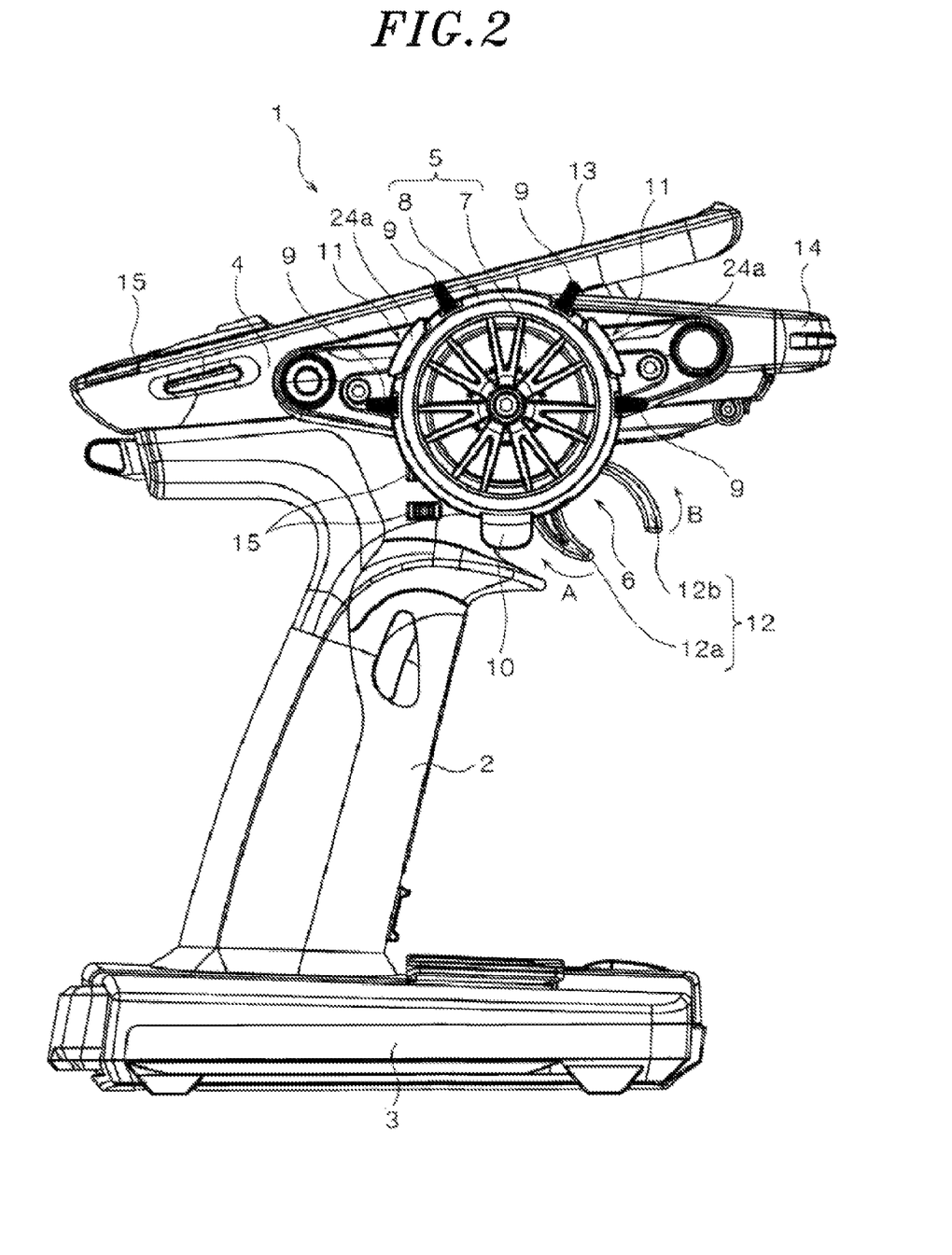
FIG. 2 is a side view showing the overall configuration of the radio control transmitter according to the present disclosure.

As shown in FIGS. 1 and 2, the transmitter 1 comprises a grip portion 2, a base portion 3, and a head portion 4. A housing of each portion is made of a flexible thermoplastic resin (e.g., general-purpose plastic). As shown in FIG. 2, in the transmitter 1, the head portion 4, the grip portion 2, and the base portion 3 are arranged in that order from the top in a substantially Z shape.

<1-1. Grip Portion>

The grip portion 2 has one end (lower end of FIGS. 1 and 2) integrated with the base portion 3 and the other end (upper end of FIGS. 1 and 2) integrated with the head portion 4. The grip portion 2 has a thin elliptical columnar outer shape elongated from the base portion 3 toward the head portion 4. The grip portion 2 is gripped by an operator who performs remote control of the control target.

<1-2. Base Portion>

The base portion 3 is disposed at one end (lower end of FIGS. 1 and 2) of the grip portion 2, and has a rectangular shape. The base portion 3 prevents a hand gripping the grip portion 2 from slipping out of the grip portion 2 by restricting a lower limit position of the hand, and also functions as a leg having a bottom surface of a predetermined installation area when the transmitter 1 is not used and placed upright on the ground, for example.

<1-3. Head Portion>

The head portion 4 is disposed at the other end (upper end of FIGS. 1 and 2) of the grip portion 2, and includes a wheel unit 5 and a trigger unit 6 as operating units for controlling the control body.

Figure 3:
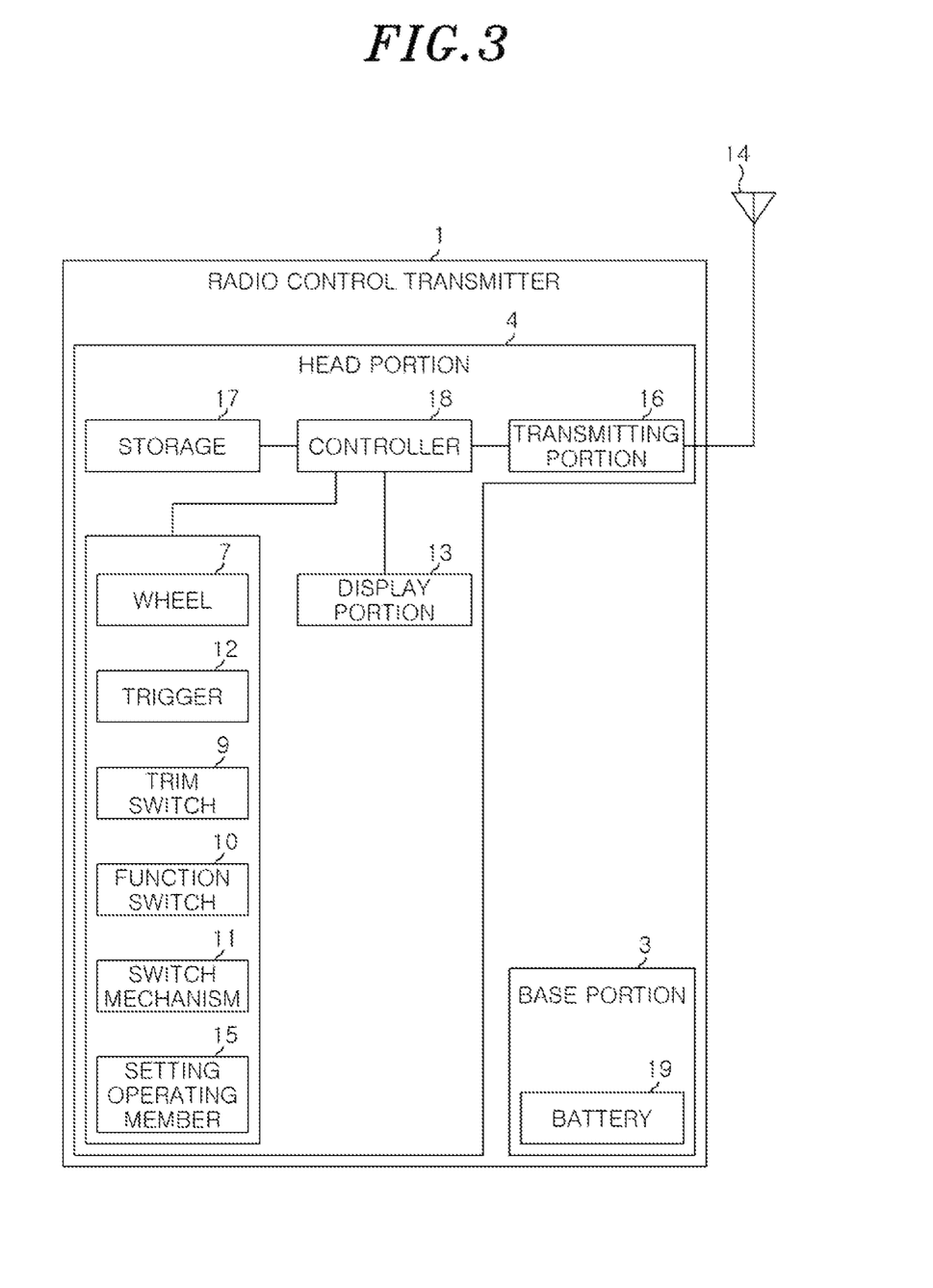
FIG. 3 is a block diagram showing an electrical configuration of the radio control transmitter according to the present disclosure.

In the wheel unit 5, a wheel (rotatable member) 7 is detachably attached to a main body fitting portion 4a of the head portion 4 via a cylindrical switch operating member 8 on one side surface (right surface or left surface) of the head portion 4 depending on a dominant hand of an operator. FIGS. 1 to 3 show a case where the operator is right-handed.

The wheel 7 is an operating member as a steering for controlling a traveling direction of the control target. As shown in FIG. 2, the wheel 7 is supported at the main body fitting portion 4a attached to one side surface (right surface or left surface) of the head portion 4 via the switch operating member 8 by a rotation shaft whose center coincides with a center of a substantially disc-shaped surface and extending along the head portion 4 of the transmitter 1 in a direction perpendicular to the substantially disc-shaped surface. The wheel 7 is operated as a steering for controlling the traveling direction of the control target while rotating in a clockwise direction and a counterclockwise direction from a predetermined reference position.

Figure 4:
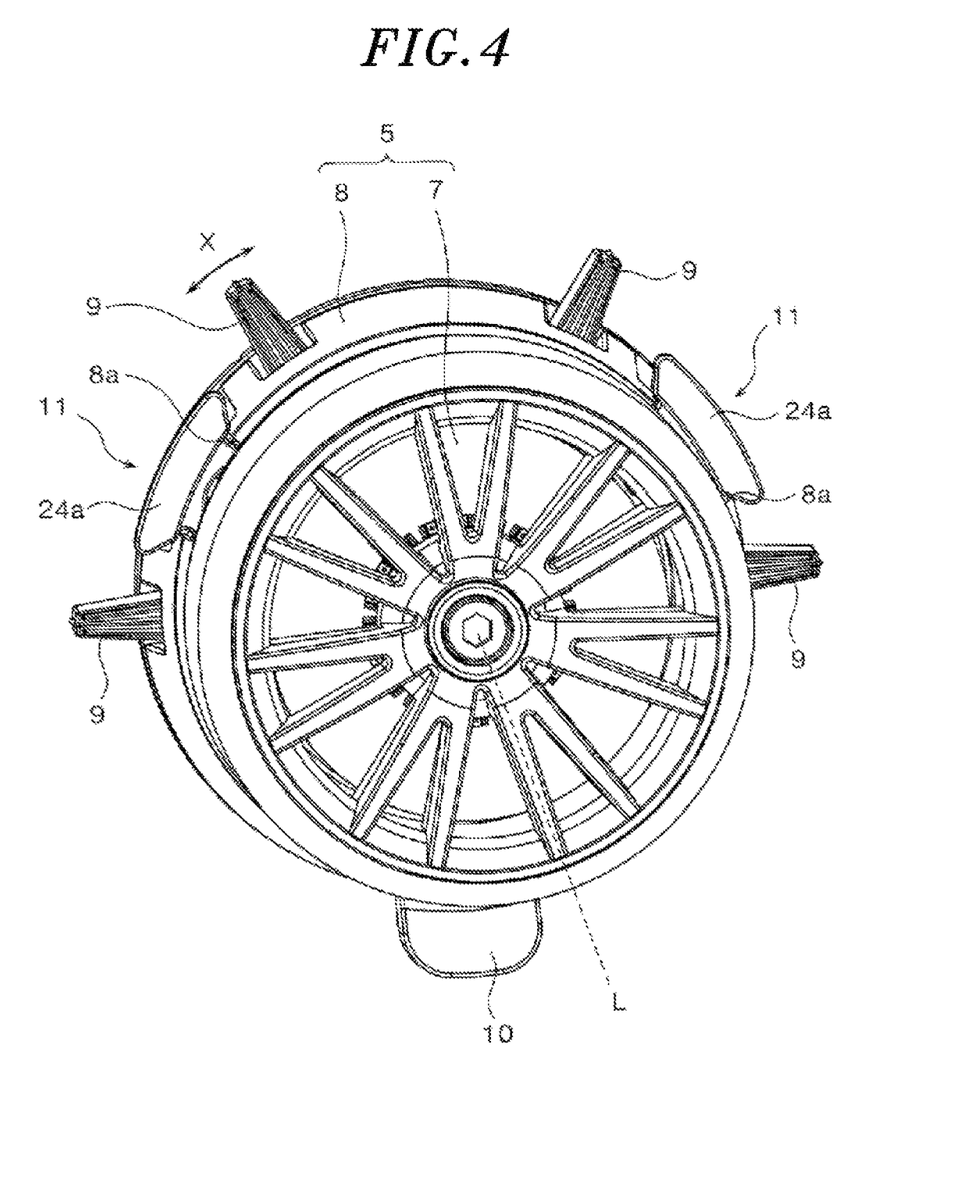
FIG. 4 is a perspective view showing an overall configuration of a wheel unit including a switch operating member provided with a switch mechanism in the radio control transmitter according to the present disclosure.

As shown in FIG. 4, a plurality of trim switches 9 (four trim switches 9 are disposed at symmetrical locations in the illustrated example) are disposed at an upper half part of an outer peripheral portion of the switch operating member 8 at predetermined intervals (predetermined angles). An arbitrary function may be assigned to each of the trim switches 9, and the pre-assigned function is activated by tilting the trim switch 9 in a rotation direction (direction of an arrow X of FIG. 4) of the wheel 7 to thereby close a contact of a corresponding switch in the housing of the switch operating member 8.

Further, as shown in FIG. 4, a function switch 10 is disposed at a lower part of the outer peripheral portion of the switch operating member 8. Similarly to the trim switch 9, an arbitrary function is assigned to the function switch 10, and the pre-assigned function is activated by pushing the function switch 10 toward the main body fitting portion 4a disposed at an axially inner side of the rotation shaft (dashed line L) of the wheel 7 of FIG. 4 to thereby close a contact of a corresponding switch in the housing of the operating member 8. The switch operating member 8 is provided with a switch mechanism 11 that is a main part of the present disclosure and operated in a different manner from the trim switch 9 and the function switch 10. The configuration of the switch mechanism 11 will be described in detail later.

The trigger unit 6 is attached to the head portion 4 via a support member (not shown) that supports the trigger 12 to be rotatable.

The trigger 12 is an operating member for controlling a moving speed of the control target by controlling a power source of the control target. As shown in FIGS. 1 and 2, the trigger 12 has a trigger shape and is divided into a throttle lever 12a as a first lever and a brake lever 12b as a second lever. The trigger 12 is attached to the head portion 4 to be rotatable in the directions of arrows A and B of FIG. 2.

As shown in FIG. 2, the trigger 12 is rotatable in the direction of the arrow A of FIG. 2 to a position where the throttle lever 12a is brought into contact with a contact surface of a support member (not shown), and is rotatable in the direction of the arrow B of FIG. 2 to a position where the brake lever 12b is brought into contact with the contact surface of the support member (not shown).

The state of the throttle lever 12a shown in FIG. 2 is set to an initial position. The throttle lever 12a is supported to be rotatable to the rear side of the head portion 4 about the rotation shaft fixed to the head portion 4 near the upper end of the grip portion 2.

A base end portion of the brake lever 12b may be fixed to the throttle lever 12a by a screw to be detachable and replaceable. In this case, multiple types of brake levers 12b, e.g., one having a length or shape corresponding to a thickness of an operator's finger, one having a buffer such as sponge or foam on a surface to be in contact with a finger to protect the finger, and the like, may be prepared in advance and replaced depending on circumstances.

In general, the trigger 12 is operated by putting an index finger or a middle finger of a hand holding the grip portion 2 on the throttle lever 12a and pulling the throttle lever 12a in the direction of the arrow A, and is operated by pushing the brake lever 12b in the direction of the arrow B with the back of the finger put on the throttle lever 12a.

The trigger 12 automatically returns to the preset initial position (state shown in FIG. 2) when the finger on the throttle lever 12a is released. The initial position is referred to as "neutral position." At the neutral position, the engine of a control target is rotating, whereas the clutch thereof is disengaged, so that the control target is not traveling.

If the power source of the control target is a motor, the motor is not rotating at the neutral position.

The throttle of the engine of the control target is controlled by pulling the throttle lever 12a of the trigger in the direction of the arrow A of FIG. 2, thereby controlling the moving speed of the control target. The control target is accelerated as the throttle lever 12a of the trigger 12 is operated in the direction of the arrow A of FIG. 2.

The brake can be controlled by operating the brake lever 12b of the trigger 12 in the direction of the arrow B of FIG. 2. The brake lever 12b of the trigger 12 has a stronger force as it is operated in the direction of the arrow B of FIG. 2.

Depending on the settings of the transmitter 1, the control target may be moved backward by operating the brake lever 12b of the trigger 12 in the direction of the arrow B of FIG. 2. Further, even when a motor is used as the power source of the control target, the control target can be accelerated by operating the throttle lever 12a of the trigger 12 in the direction of the arrow A of FIG. 2.

The transmitter 1 is provided with a plurality of operating members, such as buttons and the like, in addition to the wheel 7 and the trigger 12. Special operations related to the operation of the control target can be assigned to these operating members.

Further, the head portion 4 is provided with a display portion 13 and an antenna 14. The display portion 13 is inclined at a predetermined angle with respect to the main body of the head portion 4 connected to the grip portion 2 so that an operator can easily see a display screen when the operator grips the grip portion 2. The display portion 13 is a display for displaying settings of the transmitter 1, and it is possible to switch display contents or change the settings of the transmitter 1 by operating a setting operating member 15, such as an operation button, a slide switch, or the like, disposed around the display portion 13.

The antenna 14 of the transmitter 1 in the present embodiment is rotatably supported at one end portion (i.e., an end portion of the head portion 4 which is opposite to an end portion facing an operator in a state where the corresponding operator grips the grip portion 2) of the head portion 4 which is opposite to a display surface of the display portion 13 in a state where an operator grips the grip portion 2. In the case of performing remote control of the control target, the antenna 14 is rotated by 90° from a horizontal state (state of FIG. 2) in which it integrally forms an outer shape with the head portion 4, and is used in an upright state in a vertical direction. The directivity at the time of performing remote control of the control target can be improved by using the antenna 14 in an upright state.

<1-4. Electrical Configuration>

As shown in FIG. 3, the head portion 4 has therein an electrical circuit including a transmitting portion 16, a storage 17, and a controller 18, in addition to the above-described display portion 13.

The base portion 3 is provided with a replaceable battery 19 for supplying a driving power required for individual components (the display portion 13, the transmitting portion 16, the storage 17, and the controller 18) of the electrical circuit.

The transmitting portion 16 modulates/amplifies transmission data generated by operating or setting the wheel 7 or the trigger 12, and transmits the modulated/amplified control signal to the control target via the antenna 14 under the control of the controller 18.

The storage 17 stores various setting information based on the operation of the setting operating member 15 under the control of the controller 18. Further, the storage 17 stores the functions assigned to various switches including the trim switches 9, the function switch 10, and the switch of the switch mechanism 11 to be described later in association with the switches by the setting operation of the setting operating member 15. Further, the storage 17 stores a control program for performing driving control of individual components of the transmitter 1.

The controller 18 performs overall control of the display portion 13, the transmitting portion 16, and the storage 17, such as the generation of the transmission data in response to the operation and setting of the wheel 7 and the trigger 12, the display control of the display portion 13, the output control of the control signal from the transmitting portion 16 via the antenna 14, the storage of the setting information in the storage 17, the control of reading out and executing a function corresponding a switch that outputs a contact signal inputted from various switches (the trim switch 9, the function switch 10, the switch of switch mechanism 11 to be described later, and the like), the driving control of the individual components of the transmitter 1 based on the control program stored in the storage 17, or the like.

In the transmitter 1 configured as described above, an operator operates the trigger 12 while gripping the grip portion 2 with one hand and putting an index finger or a middle finger of the hand holding the grip portion 2 on the trigger 12, and operates the wheel 7 while holding the wheel 7 with the other hand. Then, the control signal corresponding to the operation of the trigger 12 and the wheel 7 is transmitted to the control target to perform the remote control the control target.

<2. Configuration of Switch Mechanism>

Next, a configuration of the switch mechanism 11, which is the main part of the present disclosure, will be described with reference to the accompanying drawings.

The switch mechanism 11 is operated by any finger of a hand that operates the wheel 7, and is disposed at the outer peripheral portion of the housing of the switch operating member 8. Specifically, as shown in FIGS. 2 and 4, at the outer peripheral portion of the housing, the switch mechanism 11 is disposed at each of two symmetrical locations between the trim switches 9.

Figure 6:
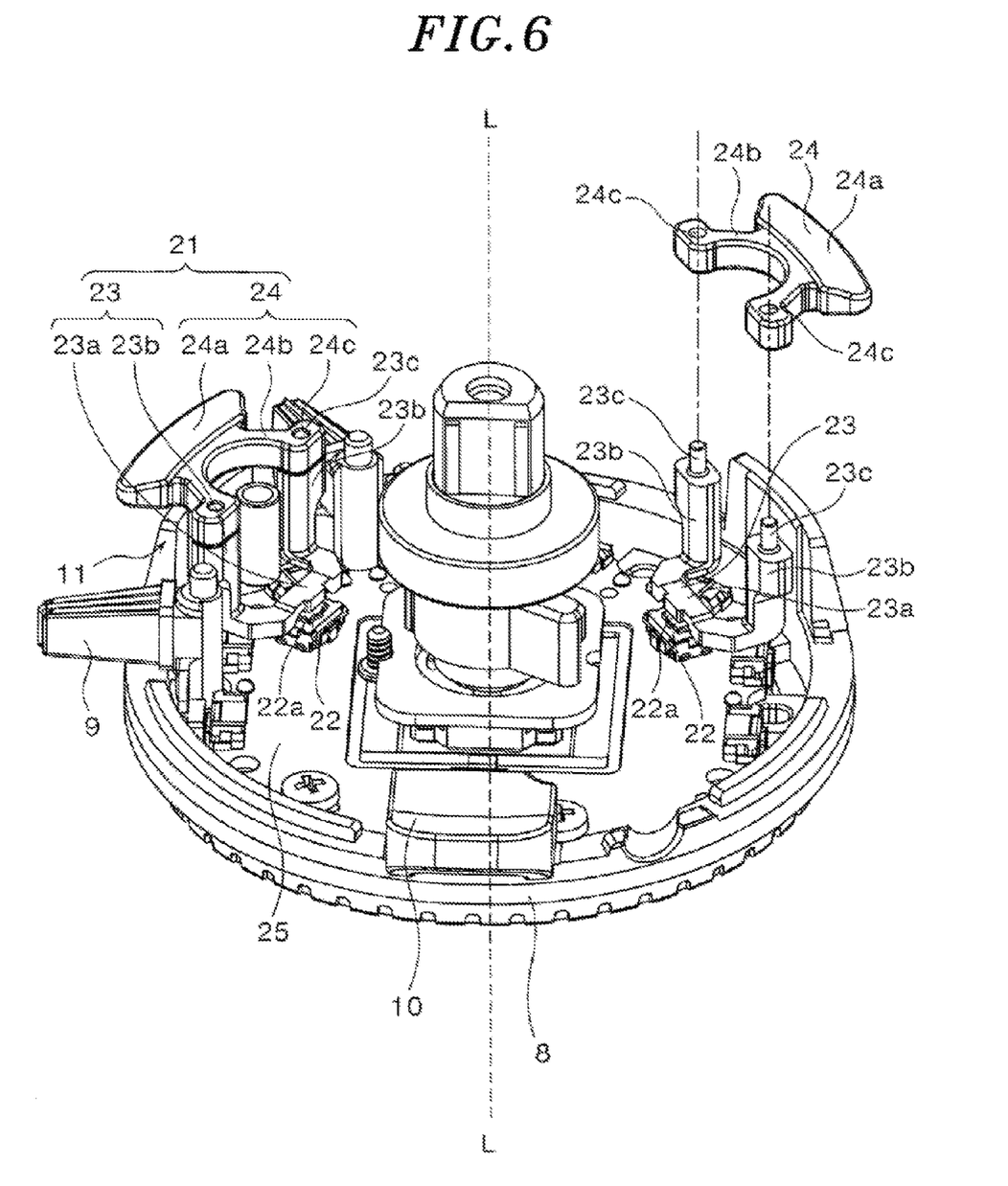
FIG. 6 is an exploded perspective view of the operating lever attached to the switch operating member of FIG. 4.
Figure 7A:
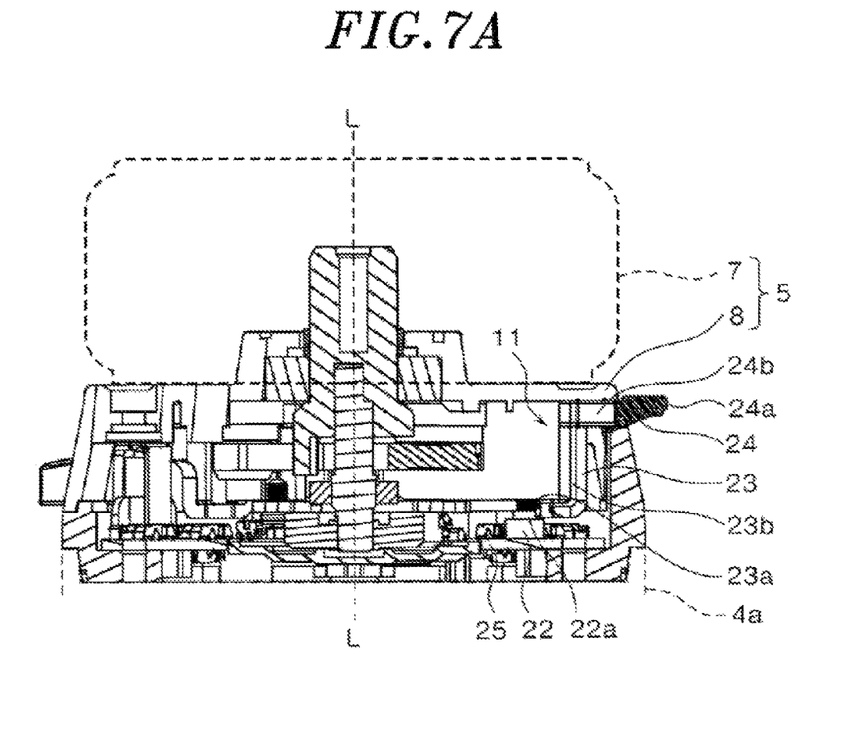
FIGS. 7A and 7B are cross-sectional views showing an operation state of the switch mechanism.
Figure 7B:
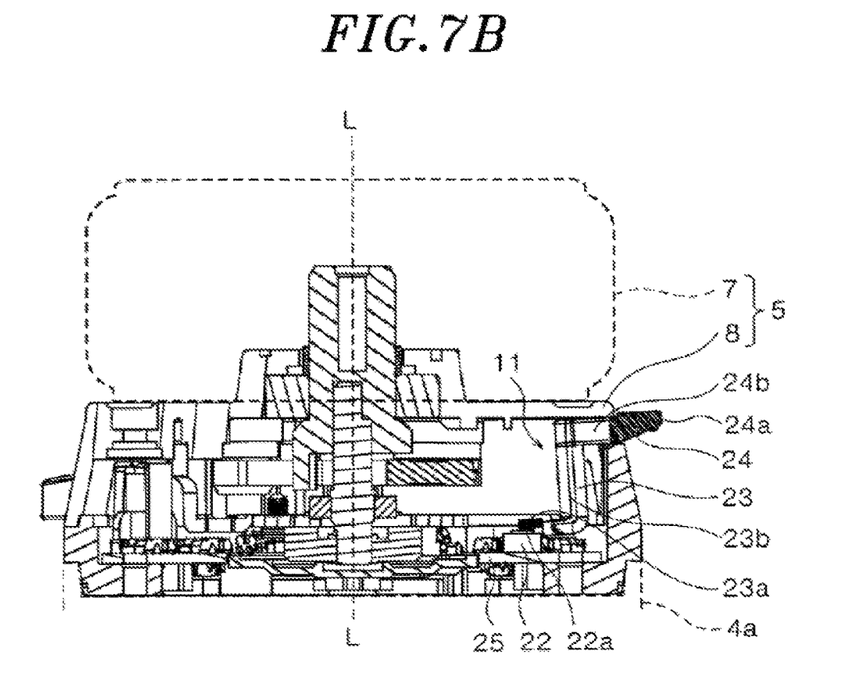

As shown in FIGS. 6, 7A, and 7B, the switch mechanism 11 includes an operating lever 21 and a switch 22, and the operating lever 21 has a lever body 23 and a lever head 24.

The lever body 23 has a bar-shaped pressing portion 23a disposed to face an operating portion 22a of the switch 22 and configured to press the operating portion 22a of the switch 22 by operating the lever head 24. Support shafts 23b are integrally formed in an upright state at both ends of the pressing portion 23a along an inner wall surface of the housing of the switch operating member 8. A fitting protrusion 23c for detachably attaching the lever head 24 is integrally formed at a tip end of each support shaft 23b.

In the lever head 24, an outer edge of a plate-shaped operating piece 24a is formed in an arc shape corresponding to the shape of the outer peripheral surface of the housing of the switch operating member 8, and a U-shaped fitting piece 24b is integrally formed at an inner edge of the operating piece 24a. The fitting piece 24b has fitting holes 24c through which the fitting protrusions 23c of the lever body 23 are inserted and detachably attached.

Figure 5:
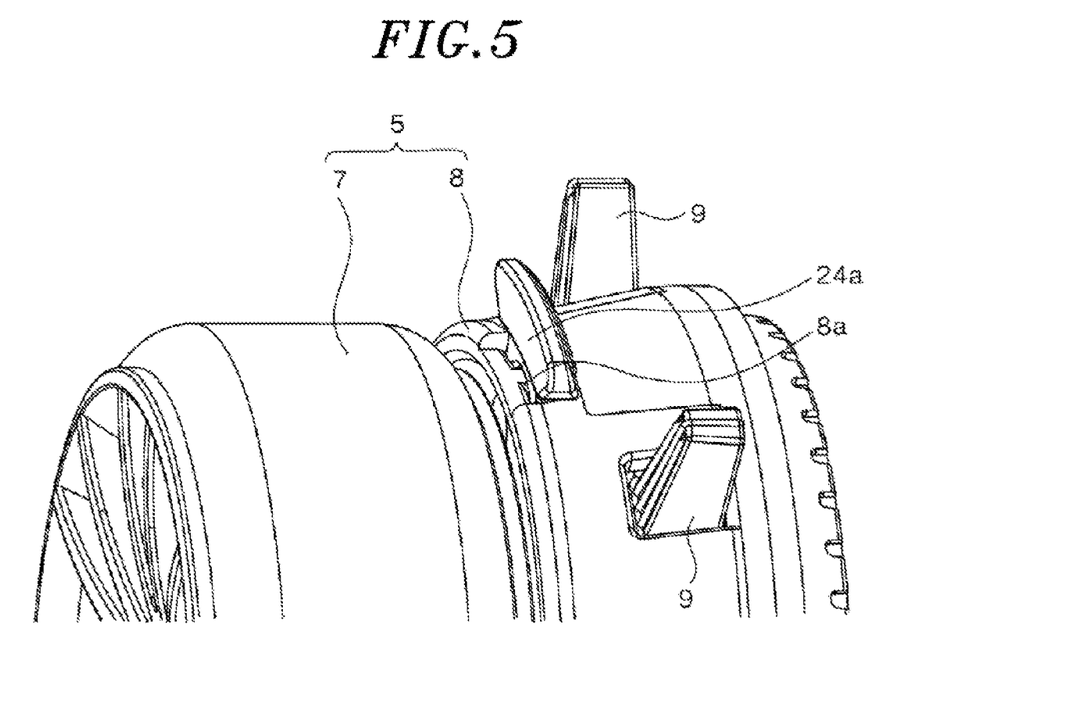
FIG. 5 is a partially enlarged perspective view showing a state in which an operating lever is attached to the switch operating member of FIG. 4.

In the operating lever 21 configured as described above, in a state where the pressing portion 23a of the lever body 23 is disposed on the operating portion 22a of the switch 22 and the support shafts 23b of the lever body 23 are inserted into the fitting holes 24c of the fitting piece 24b of the lever head 24, the operating piece 24a of the lever head 24 protrudes to the outer peripheral surface through opening holes 8a of the housing of the switch operating member 8 shown in FIGS. 4 and 5.

The switch 22 for activating the pre-assigned function is wire-connected to a substrate 25 built in and fixed to the housing of the switch operating member 8. In the switch 22, when an operation of pulling the operating piece 24a of the lever head 24 of the operating lever 21 toward an axially outer side of the rotation shaft of the wheel 7 (dashed line L of FIG. 6) from the state shown in FIG. 7A (operation of pulling the operating lever 21 toward the palm of the hand holding the wheel 7) is performed, the entire operating lever 21 rotates in a counterclockwise direction, and the pressing portion 23a of the lever body 23 is pressed. Accordingly, the contact is closed, and a contact signal is outputted to the controller 18 as shown in FIG. 7B. When the contact signal is inputted from the switch 22, the controller 18 reads out the function assigned to the switch 22 that has outputted the contact signal from the storage 17, and performs control for executing the read-out function.

The functions assigned to the switch 22 of the switch mechanism 11 including the trim switches 9 and the function switch 10 that are described above, such as various functions of multi-channels, on/off of a gimmick, switching of conditions, on/off of a lap timer for counting the number of laps, on/off of a turbo function, mixing, emergency braking, a camera, and the like, may be randomly set by an operator.

Figure 8:
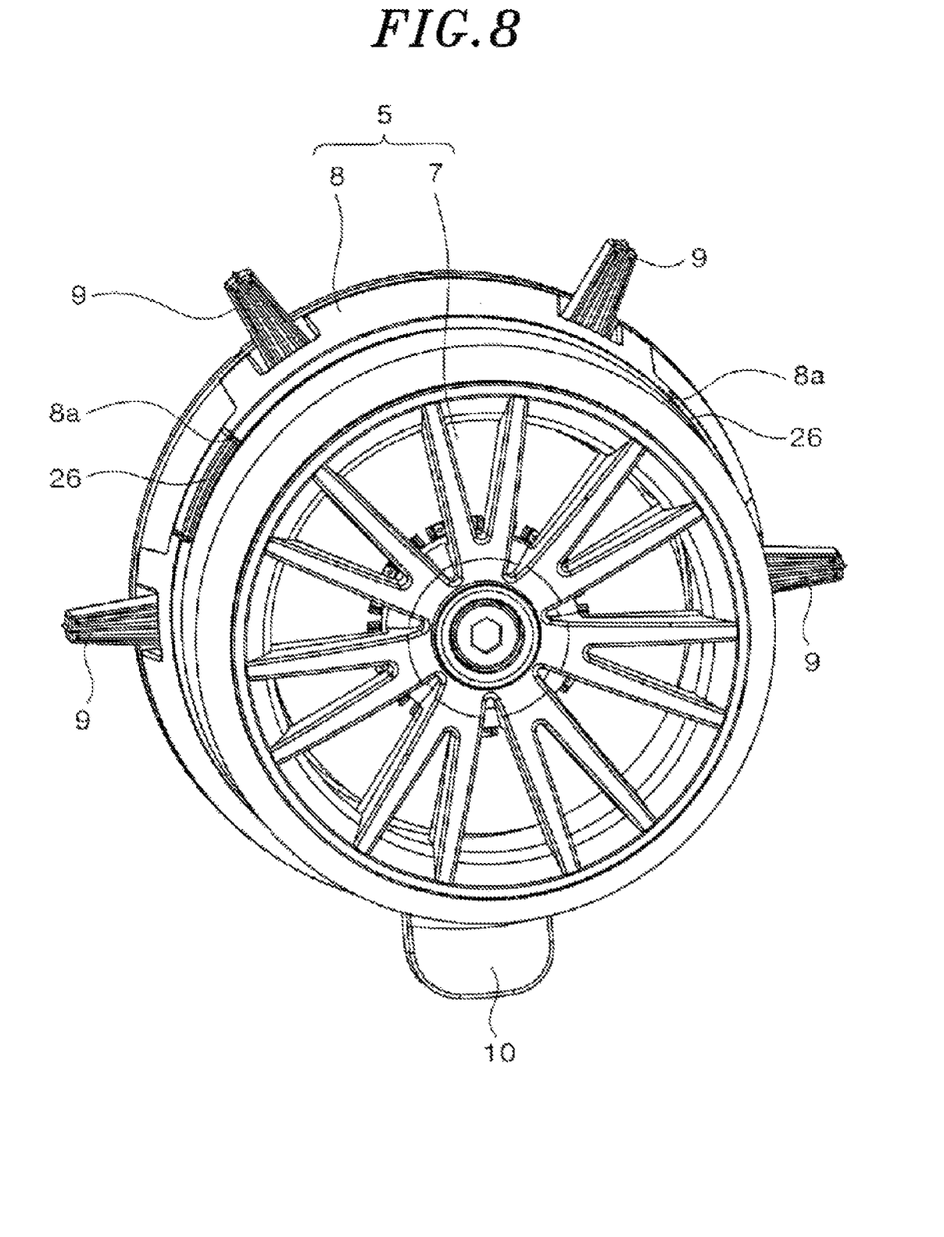
FIG. 8 is a perspective view showing the overall configuration of the wheel unit in which a cover member is attached to a space portion of the switch operating member in the radio control transmitter according to the present disclosure.
Figure 9:
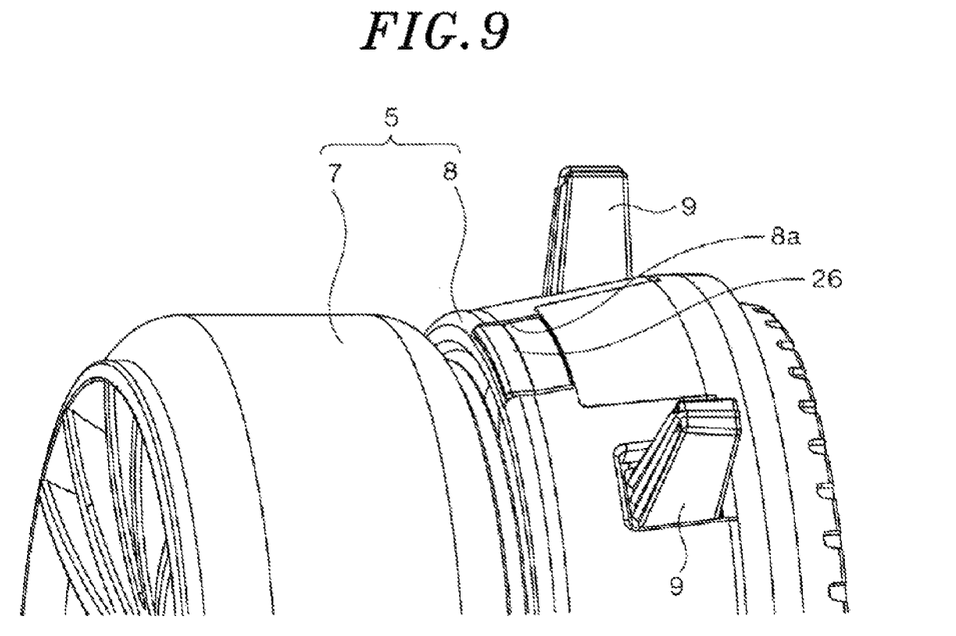
FIG. 9 is a partially enlarged perspective view showing a state in which the cover member is attached to the space portion of the switch operating member of FIG. 8.
Figure 10:
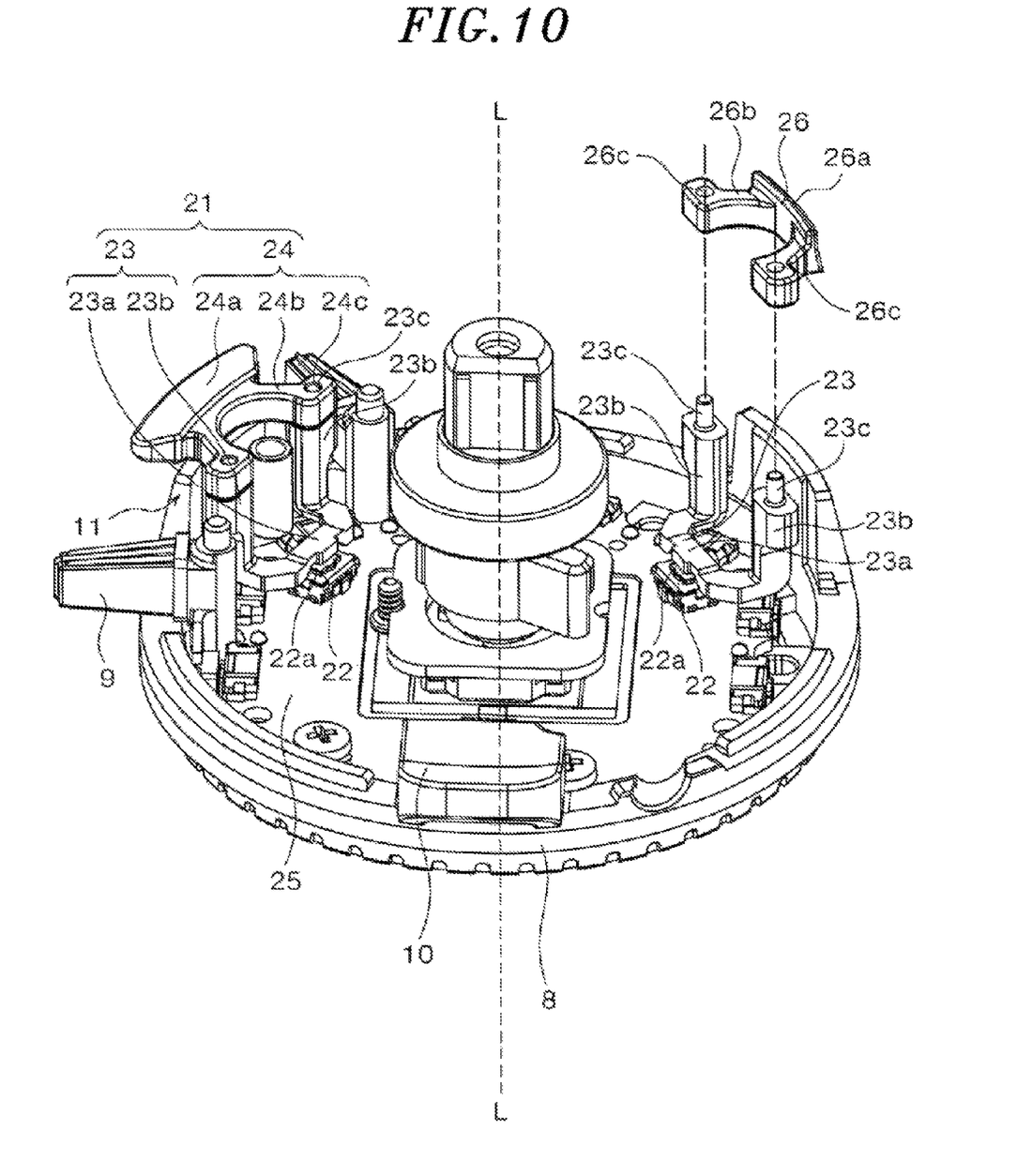
FIG. 10 is an exploded perspective view of the cover member attached to the space portion of the switch operating member of FIG. 8.

As shown in FIGS. 8 and 9, the cover member 26 blocks the opening hole 8a (the space portion through which the fitting piece 24b of the lever head 24 of the operating lever 21 penetrates) formed on the outer peripheral surface of the switch operating member 8. As shown in FIG. 10, the cover member 26 includes a cover portion 26a and a fitting piece 26b. In order to block the opening hole 8a of the switch operating member 8, the cover portion 26a has a size corresponding to the opening hole 8a of the switch operating member 8, and is formed in an arc shape corresponding to the shape of the outer peripheral surface of the switch operating member 8. The U-shaped fitting piece 26b having the same shape as that of the fitting piece 24b of the lever head 24 is integrally formed at the cover portion 26a. The fitting piece 26b has fitting holes 26c into which the fitting protrusions 23c of the lever body 23 of the operating lever 21 of the switch mechanism 11 are inserted and detachably attached.

The cover member 26 configured as described above is attached to the fitting projections 23c of the support shafts 23b of the main body 23 to block the opening hole 8a formed on the outer peripheral surface of the switch operating member 8 when the lever head 24 of the operating lever 21 is removed from the lever body 23.

The switch operating member 8 provided with the switch mechanism 11 including the trim switches 9 and the function switch 10 that are described above can be attached to and detached from the main body fitting portion 4a, and can be fixed at any location in the rotation direction. Accordingly, when an operator performs remote control of the control target and the switch mechanism 11 including the trim switches 9 and the function switch 10 that are described above is not in a position desired by the operator, the fitting position of the switch operating member 8 may be changed to locate the switch mechanism 11 at the position desired by the operator. Since the switch operating member 8 can be attached to and detached from the main body fitting portion 4a, it is possible to select a lever size later and the operator can prepare and attach a switch operating member having an original shape. Further, when the switch mechanism 11 is unnecessary, the cover member 26 may be attached to the lever body 23 to block the space portions of the switch operating member 8, thereby preventing foreign substances from entering the switch operating member 8 or preventing deterioration of the design due to the space portions (gaps) of the member 8.

The transmitter 1 of the present embodiment includes the switch mechanism 11 including the operating lever 21, to which the wheel 7 is detachably attached, disposed at the switch operating member 8 attached to the main body fitting portion 4a of the head portion 4, and the switch 22 for activating the pre-assigned function when the operation of pulling the operating lever 21 toward the axially outer side of the rotation shaft of the wheel 7 (operation of pulling the operating lever 21 toward the palm of the hand holding the wheel 7) is performed. Therefore, it is possible to diversify the switch mechanism having a unique sense of operation by providing the switch mechanism 11, in addition to the trim switch and the function switch, at the switch operating member 8.

The switch mechanism 11 is disposed at the outer peripheral portion of the switch operating member 8 near the wheel 7, and the edge of the operating piece 24a of the lever head 24 protruding from the outer peripheral surface of the switch operating member 8 is formed in an arc shape corresponding the outer peripheral surface of the switch operating member 8. Therefore, it is easy to put a finger of a hand holding the wheel 7 on the lever head 24 of the operating lever 21, and the switch mechanism 11 and the wheel can be operated at the same time. Accordingly, the operability can be improved compared to the trim switch or the function switch.

Since the switch mechanism 11 has a configuration in which the lever head 24 can be attached to and detached from the lever body 23, the function of the switch can be activated or deactivated by attaching or detaching the lever head 24 as necessary.

When the switch mechanism 11 is unnecessary, the opening holes 8a of the switch operating member 8 can be blocked by the cover member 26 by removing the lever head 24 from the lever body 23 and attaching the cover member 26 to the lever body 23. Accordingly, the control can be performed without disturbing the operation of the wheel 7.

Although the configuration in which the switch mechanism is disposed at two locations of the outer peripheral portion of the switch operating member 8 has been illustrated and described in the above embodiment, the present disclosure is not limited thereto. For example, the switch mechanism 11 may be disposed only at one location of the outer peripheral portion of the switch operating member 8. Alternatively, the switch mechanism 11 may be disposed in an empty space of the outer peripheral portion of the switch operating member 8, or disposed at three or more arbitrary locations depending on a finger used for the operation.

While the best mode of the transmitter of the present disclosure has been described, the present disclosure is not limited by the description and the drawings thereof. In other words, other embodiments, examples, operational technologies, and the like that are conceived by those skilled in the art are all included in the scope of the present disclosure.

The invention claimed is:

1. A radio control transmitter comprising a grip portion gripped by an operator at the time of performing remote control of a control target, a base portion disposed at one end of the grip portion, and a head portion disposed at the other end of the grip portion and having a wheel unit configured to control the control target, and configured to transmit a control signal to the control target in response to an operation of the wheel unit, wherein the wheel unit includes a wheel that controls a traveling direction of the control target and a switch operating member attached to a main body fitting portion of the head portion to which the wheel is detachably attached, and wherein the radio control transmitter further comprises a switch mechanism including:

an operating lever disposed at an outer peripheral portion of the switch operating member; and a switch disposed in the switch operating member and configured to activate a pre-assigned function when the operating lever is pulled toward an axially outer side of a rotation shaft of the wheel.

2. The radio control transmitter of claim 1, wherein in the operating lever, a lever head protrudes from an outer peripheral surface of the switch operating member near the wheel.

3. The radio control transmitter of claim 2, wherein in the operating lever, the lever head is attachable to and detachable from a lever body.

4. The radio control transmitter of claim 3, further comprising a cover member that is attachable to and detachable from the lever body to cover a space portion formed on the outer peripheral surface of the switch operating member when the lever head is removed from the lever body.

\* \* \* \* \*